Nov. 6, 1951  J. H. SCHROEDER  2,573,812
REAR VISION MEANS FOR AUTO VEHICLES
Filed Feb. 19, 1948
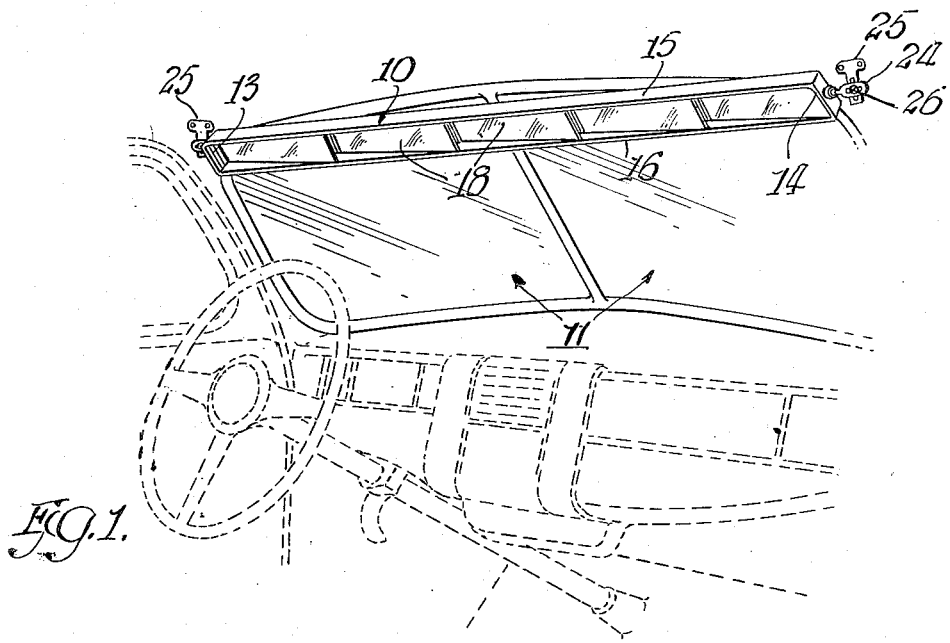
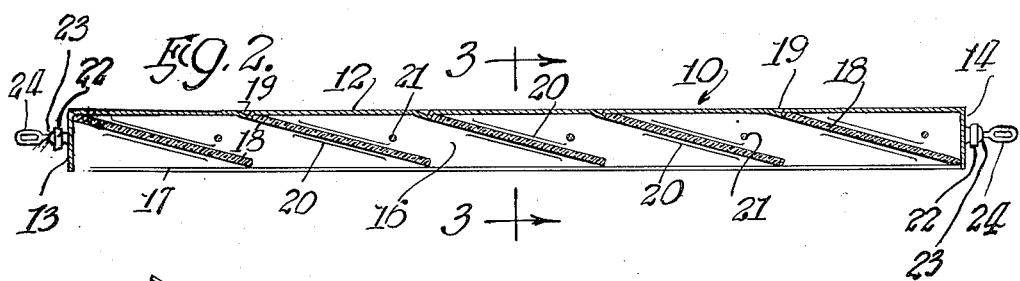
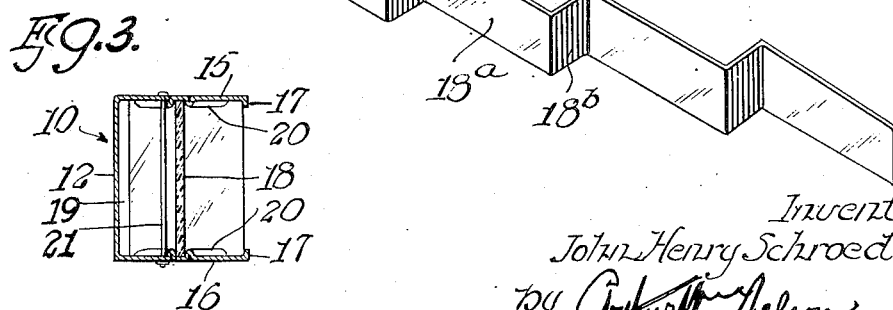
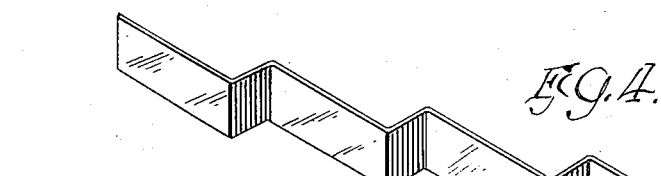
Inventor
John Henry Schroeder

UNITED STATES PATENT OFFICE 2,573,812

REAR-VISION MEANS FOR AUTO VEHICLES

John Henry Schroeder, Melrose Park, Ill.

Application February 19, 1948, Serial No. 9,407

6 Claims. (Cl. 88—86)

This relates to improvements in rear vision means for auto vehicles and it consists of the matters hereinafter described and more particularly pointed out in the appended claims.

One of the objects of the present invention is to provide improved means for association with the upper inside portion of the windshield of an automobile or the like, which will afford full clear vision to the rear right and rear left thereof without distortion of the presented view.

Another object of the invention is to provide means of this kind, giving full rear vision without the use of parts on the outside of the automobile to detract from symmetry of the body thereof.

A further object of the invention is to provide a means of this kind, which is so formed and so positioned in the automobile as to be capable of also functioning to eliminate glare through the windshield, thus avoiding the use of conventional shields for this purpose.

Again, it is an object of the invention to provide a means of this kind which also affords full rear view or vision for not only the driver, but also for the passengers on the driver's seat.

Furthermore, it is an object of the invention to provide means of this kind which is of a simple and inexpensive construction and which will not rattle when in place in an automobile and which is not in the way of persons entering or leaving the driver's compartment from either side of the automobile.

Also, it is an object of the invention to provide means of this kind which greatly improves the safety factor in driving an automobile and which makes parking maneuvers much easier in tight quarters.

The above mentioned objects of the invention, along with others, as well as the advantages thereof, will more fully appear as the specification proceeds.

In the drawings:

Fig. 1 is a perspective view of one form of the improved rear vision means, showing the same disposed in operative position across the upper inside portion of the windshield of an automobile.

Fig. 2 is a longitudinal horizontal sectional view through improved rear vision means, on a scale enlarged over that of Fig. 1.

Fig. 3 is a transverse vertical sectional view through the form shown in Figs. 1 and 2 as taken on the line 3—3 and on a scale larger than that of Fig. 2.

Fig. 4 is a perspective view showing a modified form of a part of the improved rear vision means that may be used for the reflecting surfaces thereof.

In general the improved means includes structure providing a plurality of reflecting surfaces arranged end to end for disposition across an upper inside portion of the windshield of an automobile or the like, with each surface having an inner end and an outer end, the outer end of each surface being offset rearwardly of the windshield from the plane of the inner end thereof. Preferably these surfaces, while disposed parallel with each other, are disposed at angles extending from the inner left hand end toward the outer right hand end, and provide, at a glance, full rear vision for the driver, either to the right or to the left, without a concentrated effort by the driver.

Referring now in detail to that embodiment of the invention as illustrated in Figs. 1, 2 and 3, the improved means preferably includes a horizontally disposed, elongated casing 10 of a length approximating the width of the upper inside portion of the windshield 11 of an automobile, with which it is associated. The casing, which is preferably made of sheet material, is shallower from front to rear than it is high from top to bottom. It is open at the front (toward the driver) and includes an upright back wall 12 (toward the windshield) upright end walls 13—14 respectively and horizontally disposed top and bottom walls 15 and 16, each of which terminates at the open front side of the casing as a flange or bead 17.

Disposed in said casing is a means providing a plurality of reflecting members 18, which in this instance may be flat glass mirror strips, each wider than it is high and each having a height approximating that of the height of the inside of the casing. These members are disposed at an angle diagonally of the top and bottom walls 15 and 16 of the casing and the inner and left hand end of each reflecting member is engaged against a shoulder 19 on the back wall of the casing and the outer and right hand end of each member engages with the inside of the flanges 17—17. Said shoulder 19 may be formed by inwardly pressed parts of the wall 12 of the casing, which best appear in Fig. 2. While no overlapping of the ends are shown, such an overlapping may be present and this without affecting the operations of the members 18. When the members 18 are in position in the casing, the inner end of one member is disposed substantially in the plane of the outer end of another member, transversely of the casing.

The members 18 are preferably secured to the top and bottom walls of the casing, against a lateral shifting, by means of pairs of elongated ribs or shoulders 20—20 formed by pressing parts of these walls inwardly thereof. Thus each pair of such shoulders forms a groove to receive top and bottom marginal parts of the members 18, the ends of which are engaged against the associated shoulders 19 and the flanges 17—17. With the arrangement described the said members 18 cannot shift out of their intended position in the casing. As the casing is made of relatively thin sheet metal, the top and bottom walls are preferably tied together by the bolts and nuts 21 which best appear in Figs. 2 and 3. It will be noted from Fig. 2 that these tie bolts are disposed one behind each member 18 and therefore they are not visible from the driver's seat of the automobile. By tightening up on said bolts, the top and bottom walls of the casing are drawn into solid engagement with the top and bottom edges of the members 18 so that they are securely confined in place in the casing against movement or vibration, and without the possibility of a rattle developing in the parts thereof.

Instead of employing individual members of glass, I may employ a single strip of sheet material formed into the zig-zag arrangement appearing in Fig. 4. In said Fig. 4, the reflecting portions are indicated at 18a and the inner end of one portion is connected to the outer end of another portion by a web 18b. The portions 18a have their active reflecting surfaces produced by high polishing the same and this surface may be the metal of the strip itself or one afforded by a plating applied thereto and then polished. Even the webs 18b may be polished but this is not essential and therefore they may have a dull finish.

Such a strip may be disposed in the casing, before described and will be held in place therein substantially in the manner described in connection with the members 18 of Figs. 1, 2 and 3, or in any other suitable manner.

The casing may be operatively secured in place to the inside of the fore peak of the body of the vehicle, with the casing disposed across the upper inside portion of the windshield 11. One convenient way to support the casing, so that it may be tilted transversely into the position best suited to the driver, is to provide on each end wall 13 and 14 a socket 22 to frictionally receive and grip a ball 23 on the inner end of a slotted arm 24. The slotted arms overlie associated slotted clips 25 fixed to the inside of the fore peak and the screws 26 may be employed for securing each arm to the associated clip as appears in Fig. 1. By loosening the screws 26, the casing 10 may be adjusted vertically and laterally and by means of the ball and socket joints, the casing may be set at that relative angle most suitable for the driver.

The improved means afford a full clear uninterrupted vision for the driver, is indeed helpful in parking and increases safety in straightaway traffic driving.

While in describing the invention I have referred in detail to the form, and arrangement of the parts thereof, the same is to be considered only in the illustrative sense and therefore I do not wish to be limited thereto except as may be specifically set forth in the appended claims.

I claim as my invention:

1. Rear vision means for auto vehicles including an elongated support for disposition across an upper portion of a windshield, a plurality of substantially rectangular parallel reflecting surfaces disposed longitudinally of the support in a diagonal direction at an acute angle of less than 45 degrees relative to the longitudinal axis of the support with the inner ends of the reflecting surfaces terminating in a plane and with the outer ends of the reflecting surfaces terminating in a substantially parallel plane.

2. Rear vision means for auto vehicles including an elongated box-like casing, open at the front and closed at the rear and having top and bottom walls, a plurality of substantially rectangular parallel reflecting surfaces disposed longitudinally of the casing in a diagonal direction across the top and bottom walls with the reflecting surfaces facing the open part of the casing, the inner ends of the reflecting surfaces terminating in a plane and the outer ends of the reflecting surfaces terminating in a substantially parallel plane.

3. Rear vision means for auto vehicles including an elongated support for disposition across an upper portion of a windshield, a plurality of substantially rectangular parallel reflecting surfaces disposed longitudinally of the support in a diagonal direction at an acute angle of less than 45 degrees relative to the longitudinal axis of the support, the outer end of at least one of said reflecting surfaces terminating in a plane transversely of the support, and the inner end of another adjacent reflecting surface terminating in the same transverse plane.

4. Rear vision means for auto vehicles including an elongated box-like casing, open at the front and closed at the rear and having top and bottom walls, a plurality of substantially rectangular parallel reflecting surfaces disposed longitudinally of the casing in a diagonal direction across the top and bottom walls with the reflecting surfaces facing the open front of the casing, the outer end of at least one of said reflecting surfaces terminating in a plane transversely of the support, and the inner end of another adjacent reflecting surface terminating in the same transverse plane.

5. Rear vision means for auto vehicles including an elongated box-like casing, open at the front and closed at the rear and having top and bottom walls, a plurality of substantially rectangular parallel flat mirrors disposed longitudinally of the casing in a diagonal direction across the top and bottom walls with the flat mirrors facing the open front of the casing, the inner ends of the mirrors terminating in a plane and the outer ends of the mirrors terminating in a substantially parallel plane.

6. Rear vision means for auto vehicles including an elongated box-like casing, open at the front and closed at the rear and having top and bottom walls, a strip of sheet material disposed longitudinally of the casing having a plurality of substantially rectangular parallel reflecting surfaces extending diagonally of the casing across the top and bottom walls with the reflecting surfaces facing the open front of the casing, the inner ends of the reflecting surfaces terminating in a plane and the outer ends of the reflecting surfaces terminating in a substantially parallel plane.

JOHN HENRY SCHROEDER.

REFERENCES CITED

The following references are of record in the file of this patent:

UNITED STATES PATENTS

| Number | Name | Date |
|---|---|---|
| D. 74,625 | Rivard | Mar. 6, 1928 |
| 905,565 | McNeal | Dec. 1, 1908 |
| 1,925,666 | Kerns | Sept. 5, 1933 |
| 1,928,677 | Simjian | Oct. 3, 1933 |
| 2,022,936 | Kip | Dec. 3, 1935 |